May 6, 1952  G. S. FABER  2,595,236
PRESSURE COOKER
Filed Dec. 22, 1945  3 Sheets-Sheet 1

Inventor:
Guy S. Faber,
By Clinton, Wiley, Schroeder,
Merriam & Hyrum, Attys.

May 6, 1952 G. S. FABER 2,595,236
PRESSURE COOKER
Filed Dec. 22, 1945 3 Sheets-Sheet 2

Inventor:
Guy S. Faber,
By Clinton, Wiles Schroeder,
Merriam & Hynan, Attys.

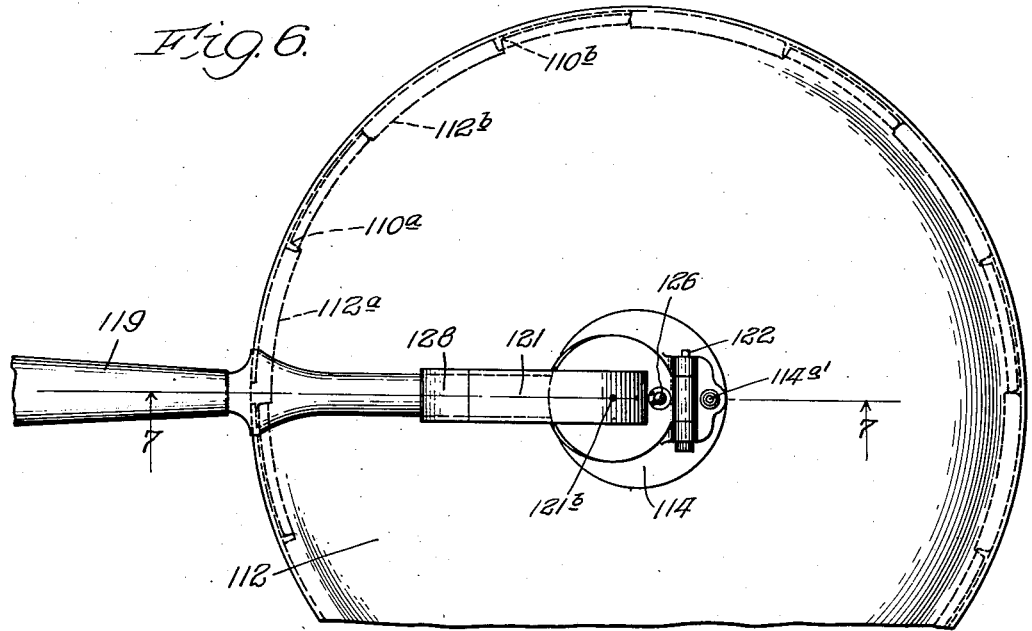
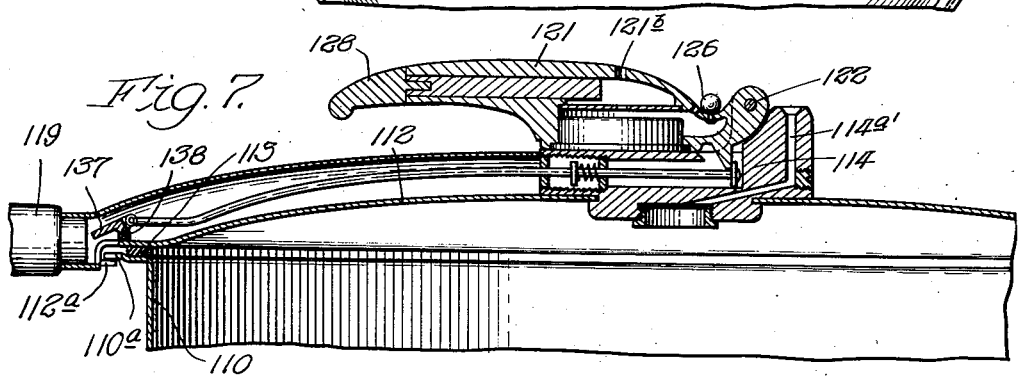
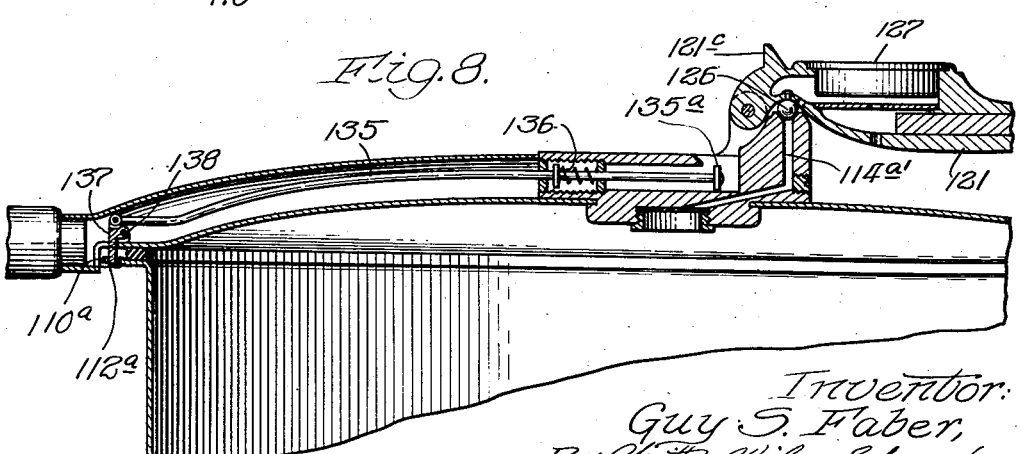

Patented May 6, 1952

2,595,236

UNITED STATES PATENT OFFICE 2,595,236

PRESSURE COOKER

Guy S. Faber, Chicago, Ill.

Application December 22, 1945, Serial No. 636,660

10 Claims. (Cl. 220—25)

This invention relates to a pressure cooker, and more particularly to a sealing and valving arrangement therefor.

Pressure cookers for domestic use are generally operated at fifteen-pound gauge pressure. Domestic pressure cookers must not only be capable of withstanding this pressure and of being properly sealed during cooking, but must also be so constructed and arranged that someone not familiar with the cooker and not following its instructions will not injure himself or herself. Furthermore, sealing with pressure rather than against pressure is obviously the desired method of effecting a closure, yet this has been commercially done heretofore only with closure arrangements comprising flexible covers, having a number of disadvantages. The usual domestic pressure cooker is also provided with valve means for venting excess pressure above a predetermined amount; but this amount is normally not adjustable.

I have overcome these and other defects in pressure cookers now being used by the cooker which is being described and claimed herein. I effect a closure wherein the steam pressure in the cooker assists in maintaining a tight seal, and which uses a rigid cover, by making the opening in the cooker body and the cover similarly unsymmetrical in shape, as elliptical rather than round, and by employing a novel closure arrangement. I also avoid danger from tampering by persons not familiar with the operation of the cooker by arranging my valve means in such manner that the closure is locked and may not be unsealed and removed from the cooker unless the valve means is first moved to open or venting position. Moreover, since it may be desirable to cook vegetables at ten or fifteen-pound pressure and to do canning at twenty or twenty-five-pound pressure, I provide an automatic safety vent which is so simple as to be fool-proof in its operation, and yet which may be readily and easily adjusted to the desired maximum operating pressure.

Figures 1, 2:
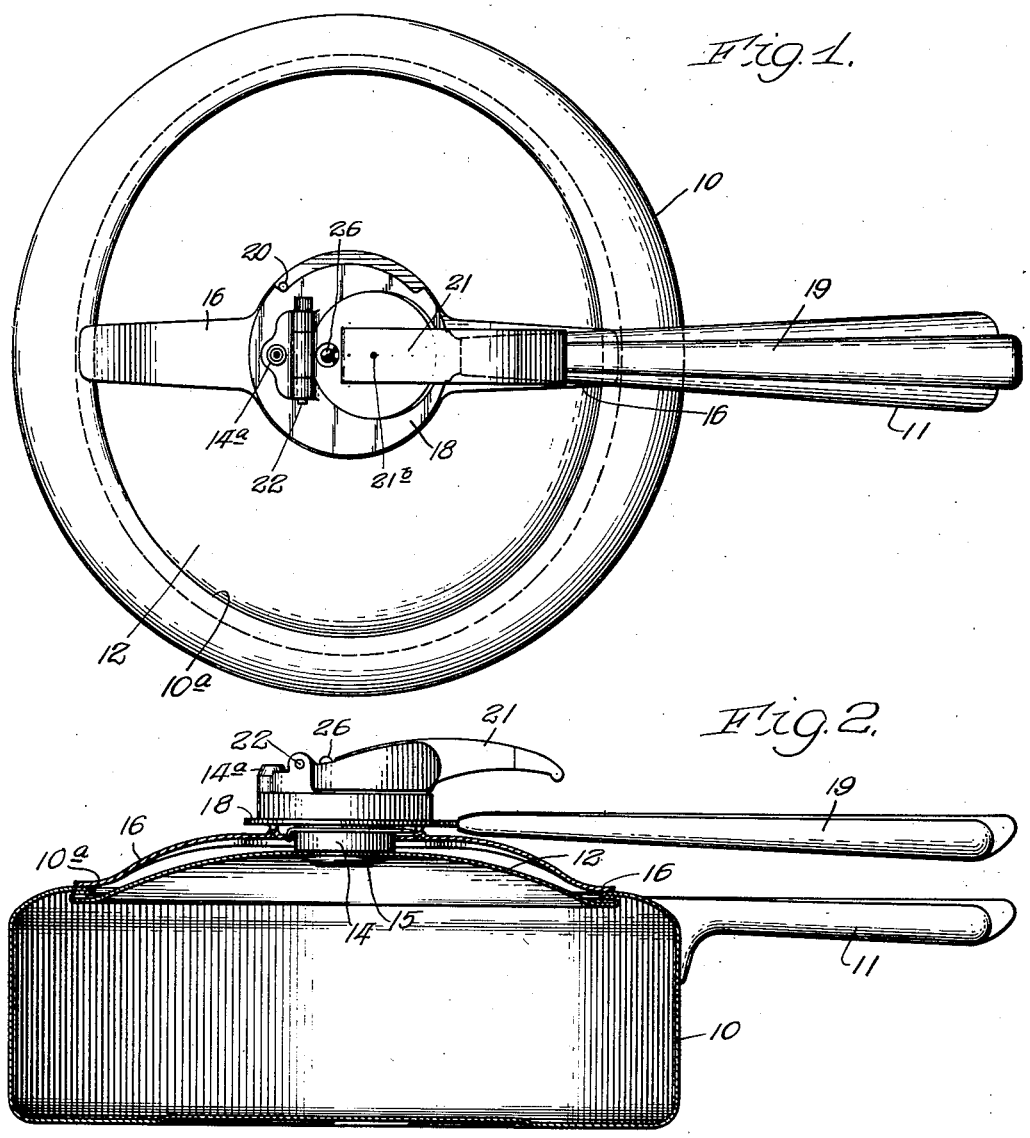
Figure 3:
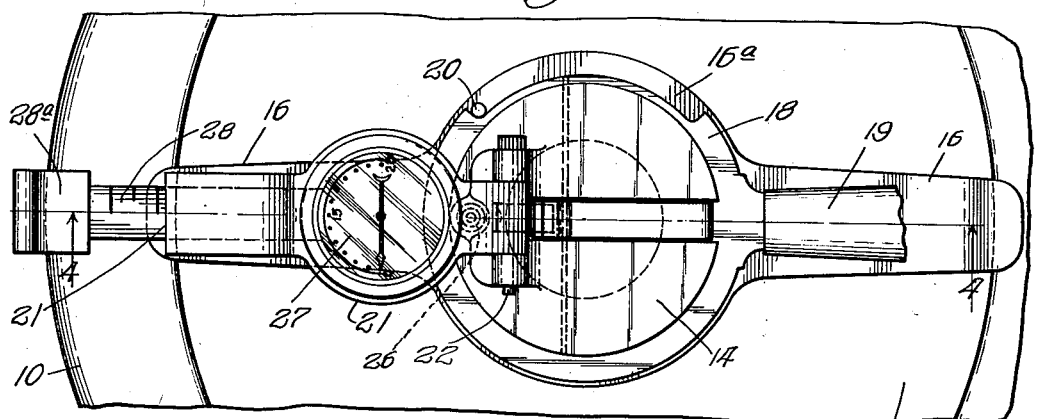
Figure 4:
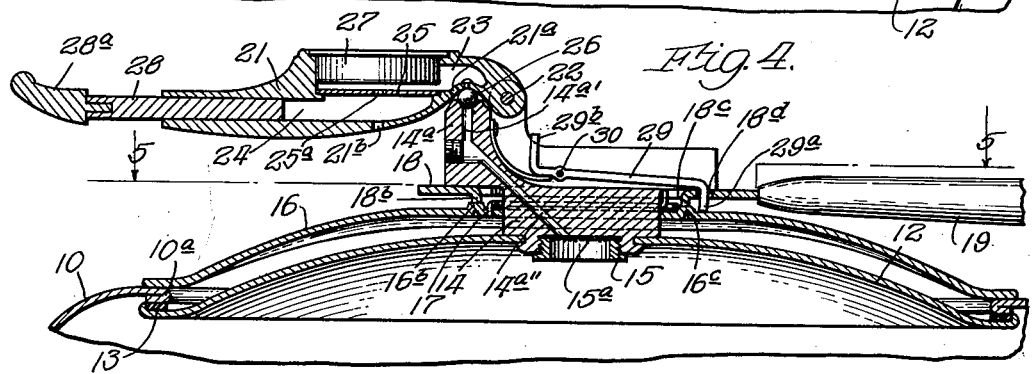
Figure 5:
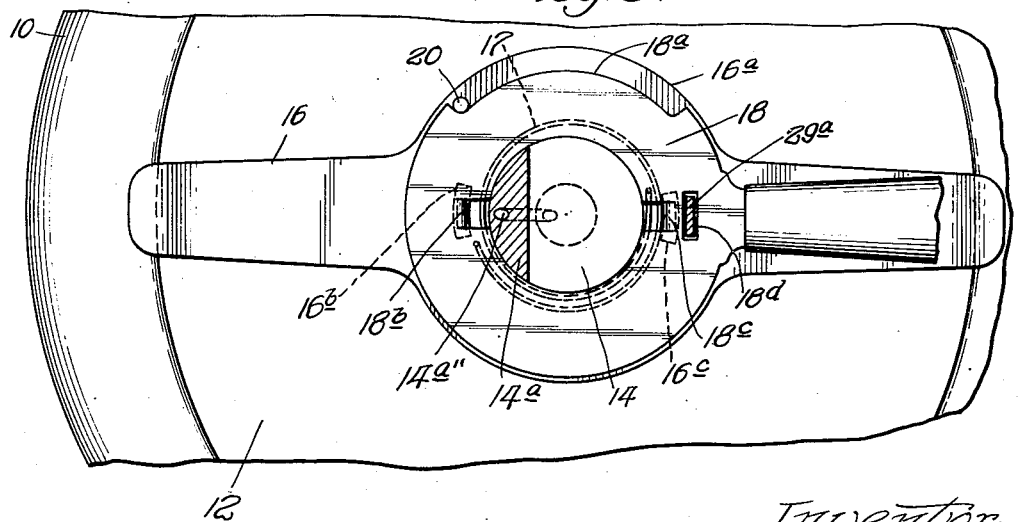

Other features and advantages of this invention will be apparent from the following specification and the drawings, in which:

Figure 1 is a top plan view of a cooker embodying my invention; Figure 2 is a vertical sectional view of the cooker body and closure parts, with the handles and valve arrangement being shown in side elevation; Figure 3 is an enlarged fragmentary top plan view of the cooker shown in Figure 1, but with the valve arrangement in its other or cooking position; Figure 4 is a fragmentary vertical sectional view along the line 4—4 of Figure 3; Figure 5 is a fragmentary horizontal sectional view along the line 5—5 of Figure 4; Figure 6 is a partial top plan view of another form of cooker embodying some of my inventions; Figure 7 is a fragmentary vertical sectional view along the line 7—7 of Figure 6, with the valve arrangement in open or venting position; and Figure 8 is a view similar to Figure 7 but with the valve in closed or cooking position.

In the preferred embodiment of my invention illustrated in Figs. 1 to 5, a cooker body or container portion 10 is shown as provided with a handle 11 and as having an elliptical opening in the top thereof surrounded by a rolled-over or flange portion 10a. The long axis of the opening (extending vertically of the sheet as the cooker is shown in Fig. 1) is preferably of the order of fifteen per cent or thereabouts longer than the axis of the opening which is at right angles thereto, for convenience in insertion and removal of the cover, as will become more apparent later.

The other or removable section of the cooker, which is separable from the body portion as a unit, comprises a cover 12 which is also unsymmetrical in shape, but similarly unsymmetrical with respect to the opening. This cover is preferably of relatively heavy gauge metal, as stainless steel or aluminum, and for all purposes in connection with this cooker is rigid. As may be best seen in Fig. 4, the outer edge or periphery of the cover may be spun or flanged upward slightly to provide a channel receiving a conventional, annular gasket 13 of synthetic rubber or other appropriate material. The dimension of the cover along its narrow axis much be greater than the similar dimension of the opening in the top of the cooker body in order to enable the cover to assume a sealing position beneath the flange 10a, as shown in Figs. 2 and 4; but it must be less than the diameter of the opening along its other or long axis so that the cover may be readily inserted in and removed from the opening by turning it at right angles to the position shown in the drawings and then tilting it somewhat. The cover is provided at its center with an upwardly extending hub portion 14 suitably sealed and locked in an opening in the center of the cover, as by being swedged therein. The opening in the center of the cover, and the portion of the hub 14 extending therethrough, are preferably square or some other suitable shape in order to prevent any possibility of rotation between the cover and the hub. As may be best seen in Fig. 4, the hub 14 and an upwardly extending portion 14a at one side thereof, integral therewith, are drilled to provide a venting passageway 14a'. The lower end of this venting passageway is closed by a screen, here identified as 15a, and shown as mounted in an insert member 15 threadable into the lower part of the hub 14. The screen, of course, prevents food particles from getting into and clogging the venting passageway 14a'.

Rotatably mounted on the hub 14 for movement through a range of 90° is a spanning member or support member 16. This support member is preferably relatively narrow, as may be best seen in Fig. 1, as for example about an inch in width; but should also be quite rigid, as by being of heavy gauge, stainless steel, cast aluminum, or the like. This support member 16 has a central, annular portion 16a (best seen in Fig. 5). This annular portion, immediately adjacent the hub 14 is provided with a cam surface (or pair of symmetrical cam surfaces), best seen in Fig. 4, and here identified as 16b and 16c. A spiral spring 17 has one end fastened to the support member 16 and the other end fastened to the hub 14, the arrangement being such that the spring tends to rotate the closure member away from a position as shown in the drawing and to a position 90° therefrom, counterclockwise as the parts are viewed in top plan in the particular cooker now being described. Immediately above the closure member 16 and also encircling the hub 14 and rotatable with respect thereto is a cam plate 18 provided with downwardly extending cam surfaces 18b and 18c cooperating with the cam segments or surfaces 16b and 16c, respectively. Attached to the cam plate to effect rotation thereof is an operating handle 19. As may be best seen in Figs. 3 and 5, the cam plate 18 is provided at one edge with a slot 18a cooperating with a pin 20 extending up from the center annulus 16a of the closure member so that a relative movement of 90° is permitted between these members, but preventing any relative movement beyond this amount.

With the parts in the position shown in the drawing, and assuming that pressure in the cooker has been reduced to atmospheric by venting (as by having the valve means in the position shown in Figs. 1 and 2), the cover may be readily and conveniently removed. To do this it is only necessary to grasp the handle 11 in one and the handle 19 in the other hand, and to rotate the handle 19 counterclockwise (speaking with respect to a top plan view of the cooker as shown) about a vertical axis through the center of the cooker. This movement of the handle 19 carries the cam plate 18 with it, and causes the cooperating cam surfaces to move relative to each other in such manner as to permit the support member 16 to move upwardly on the hub 14, separating further from the cover 12. As soon as this separation or relative movement between the support member 16 and cover 12 has proceeded to a point where the grip of the outer ends of the spanning or supporting member 16 on the upper surface of the flange 10a of the cooker body is reduced to a very low value, the force of the spring 17 causes the support member to rotate in the same direction as the handle is being rotated. This preferably occurs after the handle 19 has been rotated something in the order of 60° or 70°, and the support member 16 then rotates until the pin 20 therein strikes the edge of the slot 18a in the cam plate. The handle and support member are then preferably rotated until they are approximately 90° removed from the position shown in the drawings, whereupon the handle 19 is rotated slightly about its own axis to cause the cover 12 to be tilted. The handle is then manipulated to drop the far end of the cover slightly and the cover and handle are then rotated approximately 90° clockwise, speaking with respect to the position of the parts as shown in the drawings. When this has been accomplished, the edge of the cover closest to the hand is brought up out of the opening and with the whole cover brought through the opening by a movement substantially in the plane of the cover, this being possible since the short axis or dimension of the cover now coincides with the long axis or dimension of the opening in the top of the cooker body. When it is desired to replace the cover, the actions would be opposite to those first described. That is, the cover would first be slid into the cooker through the opening at right angles to its final position, and the cover and handle 19 turned 90° to bring the cover into proper registering relationship to the opening. The other hand would then be used to rotate the spanning or closure member 16 to the position shown in the drawings, where it would be held with the left hand, for example, while the right hand was bringing the handle 19 around clockwise to effect interaction between the tapered cam sections, causing the cover to be brought up closer to the closure member and into sealing relation with the flange 10a.

As will be readily apparent, this closure and locking arrangement provide a very simple and convenient closing system for a domestic pressure cooker which enables use of rigid parts, and particularly a rigid cover, and yet which has the great advantage of having steam pressure in the cooker assist the sealing pressure between the cover and cooker body, rather than opposing it.

The valve assembly for closing and opening the vent passageway 14a' is here shown as comprising a body member 21 pivotally mounted, as by the pin 22, in the upwardly extending portion 14a of the hub 14. This body portion has an inner cavity separated into two chambers 23 and 24 (as may be best seen in Fig. 4) by a diaphragm member 25. A ball 26 is suitably mounted on the valve body 21 in such manner that when the valve body is moved to the closing position, as shown in Fig. 4, the ball 26 seats in and seals the upper end of the venting passageway 14a'. Immediately adjacent the ball and slightly to one side thereof, the body 21 is provided with an opening 21a communicating with the chamber 23, an opening 25a in the diaphragm member providing communication between the chambers 23 and 24, and an opening 21b venting the latter to atmosphere. As will be readily apparent, movement of the valve body 21 pivotally about the pin 22 to the position shown in Fig. 2 leaves the passageway 14a' open to atmosphere and vents any pressure in the cooker; whereas pivotal movement of the valve body 21 to the position shown in Fig. 4 closes off the venting passageway and seals the cooker so that pressure may be raised therein. A temperature gauge 27, preferably of the temperature responsive type but calibrated both in temperature and corresponding steam pressures, is mounted in the valve body 21 in such manner that the indicating dial is visible only when the valve assembly is in passage-closing position, as shown in Fig. 4, this gauge serving to indicate the temperature and pressure conditions in the cooker.

The weight of the valve assembly is so proportioned relative to the diameter of the venting passageway where the ball 26 seats in it that pressures exceeding those desired in the cooker will lift the ball 26 (and with it the valve assembly body) to cause venting of the cooker until the pressure has dropped to a safe level, below the maximum desired. The provision of the chambers and openings heretofore described in the valve body provides a whistle or audible signal when the cooker vents, the tone changing and finally dropping off to inaudibility as the pressure in the cooker drops back below the desired maximum. The audible signal when the ball 26 lifts is provided, of course, by steam from the passageway 14a' entering the opening 21a and then passing out to atmosphere through the openings 25a and 21b.

Inasmuch as various types of pressure cooking are best carried on at different pressures, it is very desirable to have some means of conveniently and readily adjusting the pressure at which the safety valve arrangement will lift, although this has not been heretofore commonly done on pressure cookers. I accomplish this by providing a slide member 28 slidably mounted in a suitable opening in the valve assembly body 21, as may be best seen in Fig. 4, to be slidable toward and away from the pivot pin 22. The slide member 28 has preferably a tight though slidable fit in the cooperating part of the valve body 21, and is provided with a weighted outer end 28a. Moreover, its upper surface is preferably provided with graduations, as may be best seen in Fig. 3, cooperating with the outer end of the valve body 21 to indicate the pressure for which the safety relation is set. In a preferred embodiment of my invention, for example, moving the slide member 28 all the way in (to the right as viewed in Fig. 4) would result in the cooker venting when the pressure exceeded ten pounds; whereas moving the slide member 28 to the left, further away from the pivot pin 22, and increasing the leverage effect of the weighted end 28a, would enable adjustment of the venting pressure to any desired value up to a maximum of twenty-five pounds, usually sufficient for any domestic cooking purposes.

Since an inexperienced person or a child might accidentally try to remove the cover without first venting the pressure in the cooker, with attendant danger, I provide means for positively preventing this. This means may be best seen in Fig. 4. It comprises a latch member 29 pivotally mounted on the hub 14 by the pin 30. The right-hand end 29a of the latch member (as viewed in Fig. 4) is adapted to extend down through an opening 18d in the cam plate, or to be lifted up out of this opening, depending upon the position of the latch member 29. This position is in turn controlled by interaction between the left-hand end 29b, extending upwardly in such manner as to be struck by the body 21 of the valve arrangement when the latter is pivoted to open or venting position. When the valve assembly is in passage-closing position, as shown in Fig. 4, the latch member extends down through the opening in the cam plate and positively prevents opening of the cooker; and the opening procedure can be effected only after the valve assembly has been swung to the right, as shown in Figs. 1 and 2, this automatically lifting the end 29a of the latch up out of the opening 18d and permitting the cam parts to be moved relative to each other to effect removal of the closure.

The modification or form of pressure cooker shown in Figs. 6 to 8 will now be described, reference numerals one hundred higher than those used in the description of Figs. 1 to 5 being applied to analogous parts to enable the description of this second form of my invention to be kept brief.

In this form of cooker now being described, a cooker body 110 is again closed by a cover 112; but in this case the cover and body opening are round and sealing engagement therebetween is effected in what may be termed a "breach block" manner well known in the art and which I do not claim to have invented. In this closure arrangement, the cooker body 110 is provided around its periphery with inwardly extending, sloping flange segments 110a, 110b, etc.; and the cover is spun over and formed back in separated cooperating flange segments 112a, 112b, etc. Closure of the cooker is effected by dropping the cover in place and then rotating it, by the handle 119, 15° or 20° until the cam interaction between the spaced flange segments around the periphery has provided the desired sealing pressure on the gasket 113; and opening is effected in the opposite manner, by first rotating the cover slightly and then lifting it off when the body and cover segments are no longer in registry but lie in the spaces between each other. Since this method is well known in the art, it will not be further described or illustrated in detail here.

This second form of cooker disclosed in Figs. 6 to 8, however, illustrates another application of my valve arrangement and latching means. The valve arrangement is similar to that illustrated and described earlier comprising a body portion 121 pivotally mounted on the pin 122 and carrying a ball 126 adapted to seat in and close the venting passage 114a' when the valve assembly is swung over to the position illustrated in Fig. 8. The valve arrangement is again provided with the features of audible signaling, of a pressure and temperature gauge, and of adjustment means described earlier, the gauge being identified as 127 and the adjustment slide member as 128.

In the form of cooker now being described, however, latching and unlatching as a function of safety valve position is effected in a slightly different manner than in that previously described. In this form of my invention, the valve body 121 is provided with a lug portion 121c adapted to engage the head 135a of a longitudinally movable latch rod 135. This latch rod is normally urged to the left, as viewed in Figs. 7 and 8, by a spring 136; and it is pivotally connected at its outer end to a latch member 137 in turn pivotally mounted on the pin 138. When the safety valve arrangement is in passage-closing position, as illustrated in Fig. 8, the spring 136 urges the member 135 to the left and pivots the member 137 around to the position shown, where it lies adjacent one side or shoulder of a flange 110a on the cooker body, preventing rotation of the cover in a direction permitting opening of the cooker. When the safety valve assembly is swung over to the venting position, as illustrated in Fig. 7, however, thus releasing pressure in the cooker, the lug 121c engages the head 135a and slides the member 135 to the right (overcoming the spring 136 which is preferably relatively light), this action swinging the latch member 137 up to the position shown in Fig. 7 and permitting relative motion between the cover and cooker body enabling the cover to be removed.

Having described my invention in considerable detail as related to several embodiments of the same, it is my intention that the invention be not limited to these details but rather be construed broadly within its spirit and scope as set out in the accompanying claims.

I claim:

1. A pressure cooker of the character described, including: a cooker body having an opening in the top thereof of unsymmetrical shape, said opening having a flange therearound, a closure member of similar unsymmetrical shape, this closure member being of rigid material and adapted to underlie said flange, a support member adapted to lie above said flange and having an opening through the center thereof with cam means therearound; and closure operating means rotatably connected to said closure member through the opening in the support member and having a portion cooperating with said cam means for moving said members toward and away from each other.

2. A pressure cooker of the character described, including: a cooker body having an opening in the top thereof of unsymmetrical shape, said opening having a flange therearound, a closure member of similar unsymmetrical shape, this closure member being of rigid material and adapted to underlie said flange, a support member adapted to lie above said flange and having an opening through the center thereof with cam means therearound; and closure operating means comprising handle means and means rotatably connected to said closure member through the opening in the support member and having a portion cooperating with said cam means for moving said members toward and away from each other.

3. A pressure cooker of the character described, including: a cooker body having an opening in the top thereof of unsymmetrical shape, said opening having a flange therearound, a closure member of similar unsymmetrical shape, this closure member being of rigid material and adapted to underlie said flange, and having an upwardly extending hub portion in the center thereof; a support member adapted to lie above said flange and having an opening through the center thereof with cam means therearound, said hub portion extending through said opening; and closure operating means comprising handle means and annular means rotatably connected to said hub portion and having a portion cooperating with said cam means for moving said members toward and away from each other.

4. A pressure cooker of the character described, including: a cooker body having an opening in the top thereof of unsymmetrical shape, said opening having a flange therearound; a closure member of similar unsymmetrical shape, this closure member being of rigid material and adapted to underlie said flange; a support member adapted to lie above said flange; spring means tending to rotate said support member in only one direction relative to said closure member; and means interconnecting said members and including cam means for moving said members toward and away from each other.

5. A pressure cooker of the character described, including: a cooker body having an opening in the top thereof of unsymemtrical shape, said opening having a flange therearound, a closure member of similar unsymmetrical shape, this closure member being of rigid material and adapted to underlie said flange, and having an upwardly extending hub portion in the center thereof; a support member adapted to lie above said flange and having an opening through the center thereof with cam means therearound, said hub portion extending through said opening; spring means tending to rotate said support member in one direction about said hub portion; and closure operating means comprising handle means and annular means rotatably connected to said hub portion and having a portion cooperating with said cam means for moving said members toward and away from each other.

6. A pressure cooker of the character described, including: a cooker body having an opening in the top thereof; a closure member adapted to seal said opening; operating means cooperating with said closure member, said means being movable to a position in which it causes said opening to be sealed by said closure member; valve means including a pivotally mounted portion movable between valve-opening and valve-closing positions; and means whereby movement of said pivotally mounted portion to valve-closing position latches said movable operating means in opening-sealing position.

7. A pressure cooker of the character described, including: a cooker body having an opening in the top thereof; a closure member adapted to seal said opening; operating means rotatable about a vertical axis through the center of the cooker body to a position in which it causes said opening to be sealed by said closure member; valve means including a pivotally mounted portion movable between valve-opening and valve-closing positions; and means whereby movement of said pivotally mounted portion to valve-closing position latches said movable operating means in opening-sealing position.

8. A pressure cooker of the character described, including: a cooker body having an opening in the top thereof; a closure member having a valve opening therethrough, said closure member being adapted to seal said opening; operating means cooperating with said closure member, said means being movable to a position in which it causes said opening to be sealed by said closure member; pivotally mounted means movable between positions opening and closing said valve opening; and means whereby movement of said pivotally mounted means to valve-closing position latches said movable operating means in opening-sealing position.

9. A pressure cooker of the character described, including: a cooker body having an opening in the top thereof of unsymmetrical shape, said opening having a flange therearound; a closure member of similar unsymmetrical shape having a valve opening therethrough, this closure member being of rigid material and adapted to underlie said flange and seal said opening; a support member adapted to lie above said flange; means interconnecting said members and including cam means for moving said members toward and away from each other to effect sealing and unsealing of said opening; pivotally mounted means movable between positions opening and closing said valve opening; and means whereby movement of said pivotally mounted means to valve-closing position latches said movable operating means in opening-sealing position.

10. A pressure cooker of the character described, including: a cooker body having an opening in the top thereof of unsymmetrical shape, said opening having a flange therearound; a closure member of similar unsymmetrical shape, this closure member being of rigid material and adapted to underlie said flange; a support member adapted to lie above said flange and having horizontally disposed cam means thereon; and closure operating means connected to said closure member for horizontal rotation and having a portion cooperating with said cam means for moving said members toward and away from each other.

GUY S. FABER.

REFERENCES CITED

The following references are of record in the file of this patent:

UNITED STATES PATENTS

| Number | Name | Date |
|---|---|---|
| 1,361,946 | Whitaker | Dec. 14, 1902 |
| 1,821,726 | Saporta | Sept. 1, 1931 |
| 1,844,970 | Muller et al. | Feb. 16, 1932 |
| 2,188,735 | Grundstrom | Jan. 30, 1940 |
| 2,282,011 | Vischer | May 5, 1942 |
| 2,294,746 | Grundstrom | Sept. 1, 1942 |
| 2,373,620 | Vischer | Apr. 10, 1945 |
| 2,436,566 | Goldberg | Feb. 24, 1948 |